Dec. 9, 1941.          H. E. TAUTZ          2,265,407
TILTING ARBOR SAW
Filed Jan. 25, 1939          3 Sheets-Sheet 1
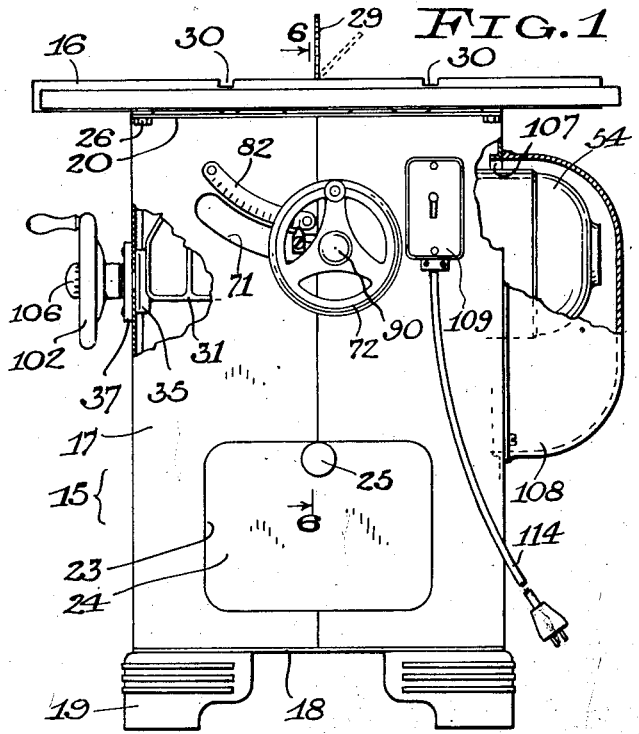
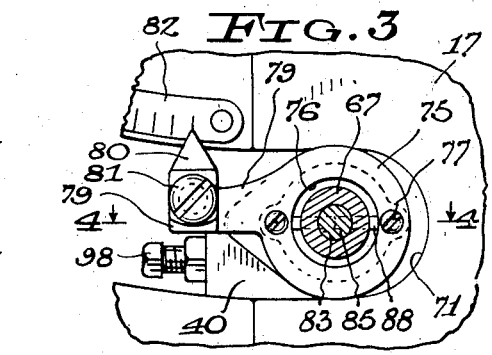
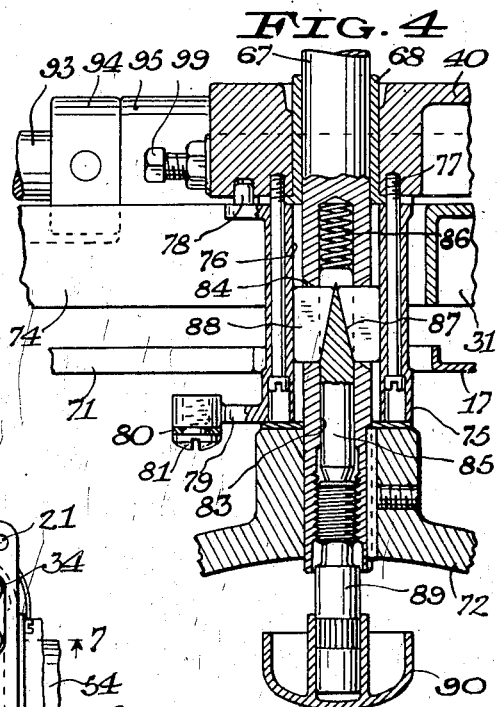
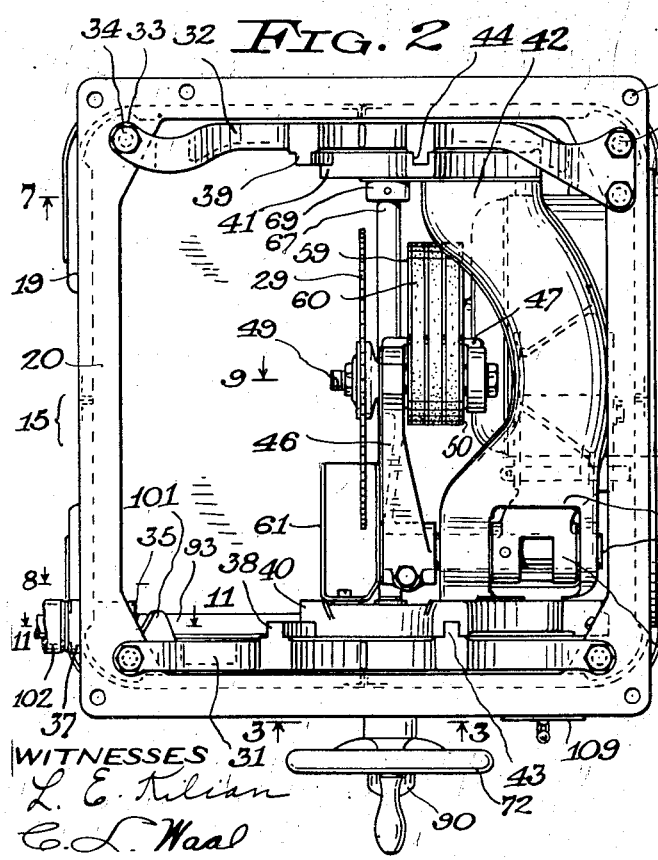
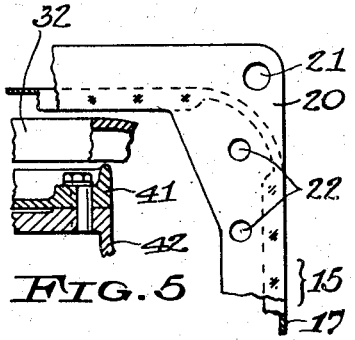
INVENTOR
HERBERT E. TAUTZ
BY R. S. Caldwell
ATTORNEY
WITNESSES
L. E. Kilian
C. L. Waal Dec. 9, 1941.  H. E. TAUTZ  2,265,407
TILTING ARBOR SAW
Filed Jan. 25, 1939  3 Sheets-Sheet 2
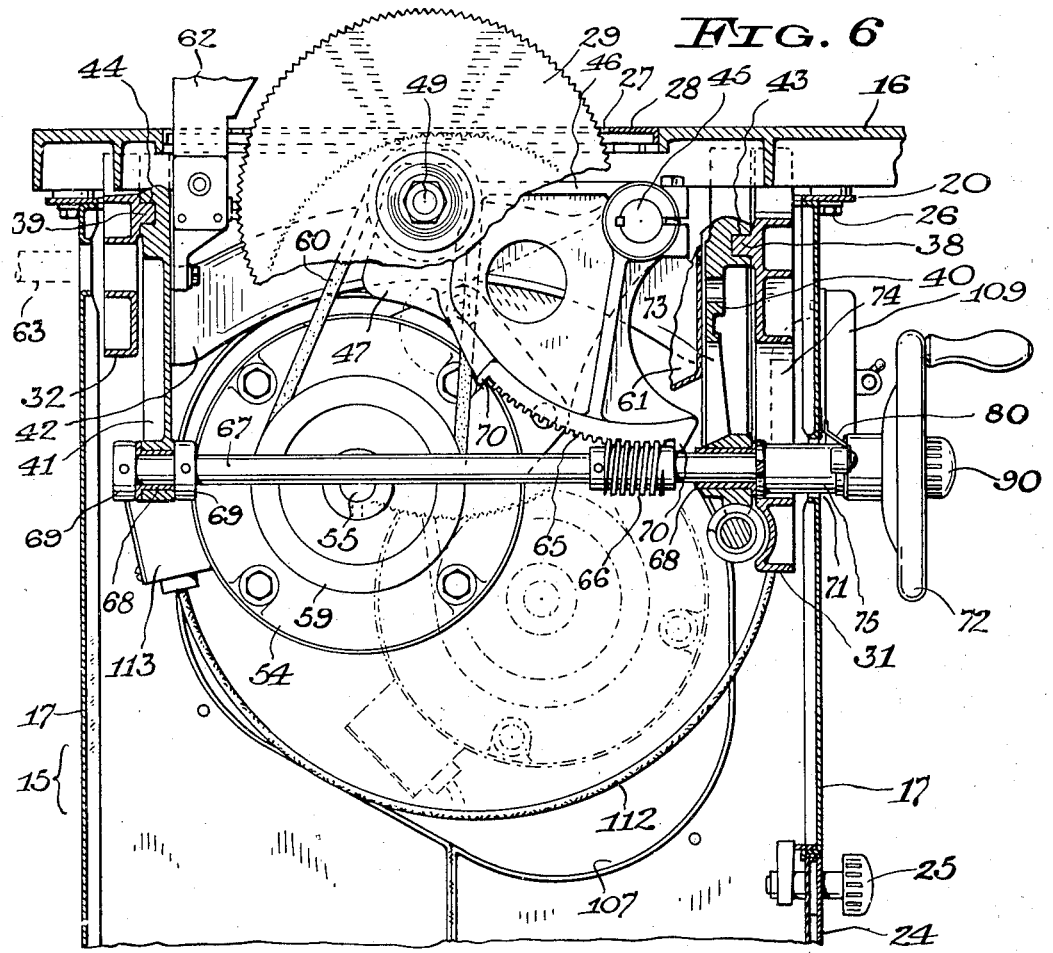
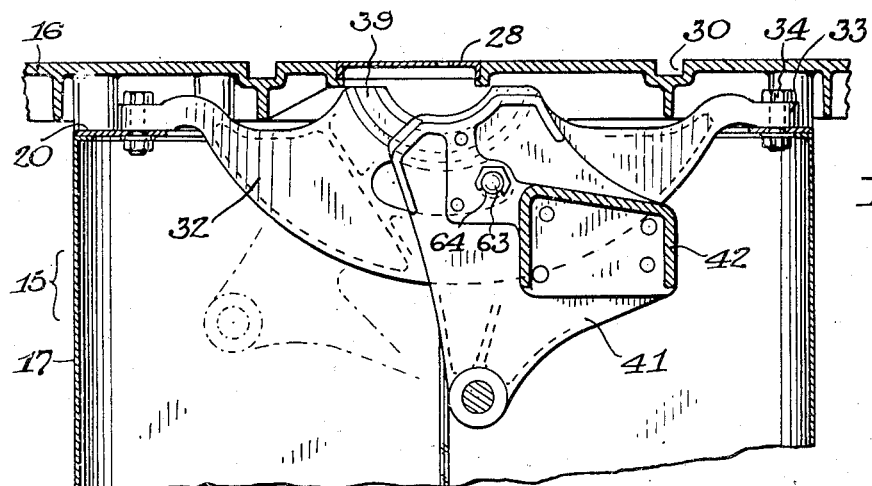
INVENTOR
HERBERT E. TAUTZ
BY
ATTORNEY
WITNESSES Dec. 9, 1941.  H. E. TAUTZ  2,265,407
TILTING ARBOR SAW
Filed Jan. 25, 1939   3 Sheets-Sheet 3
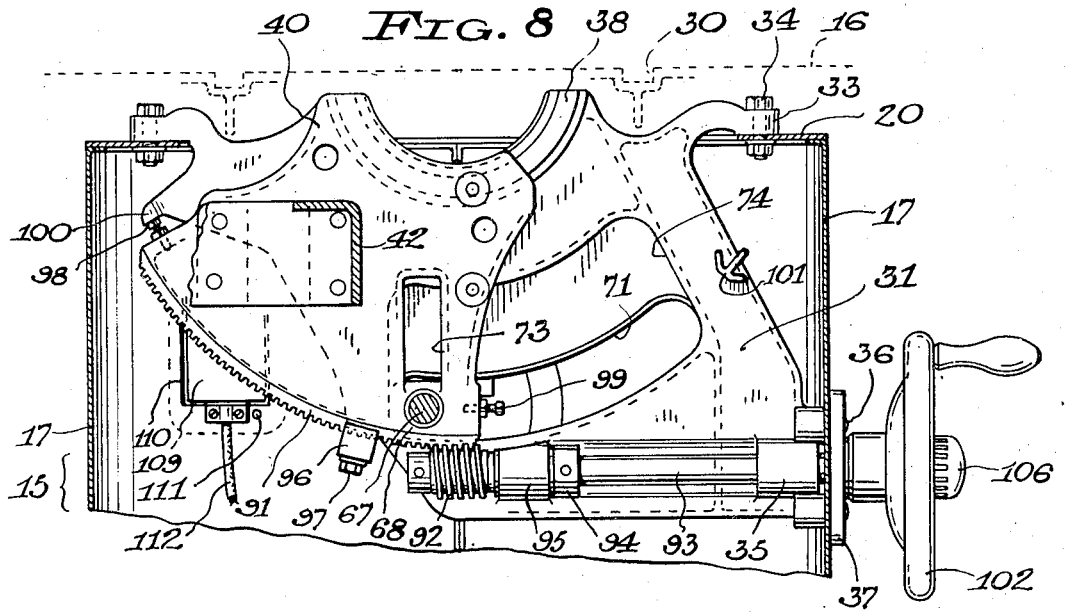
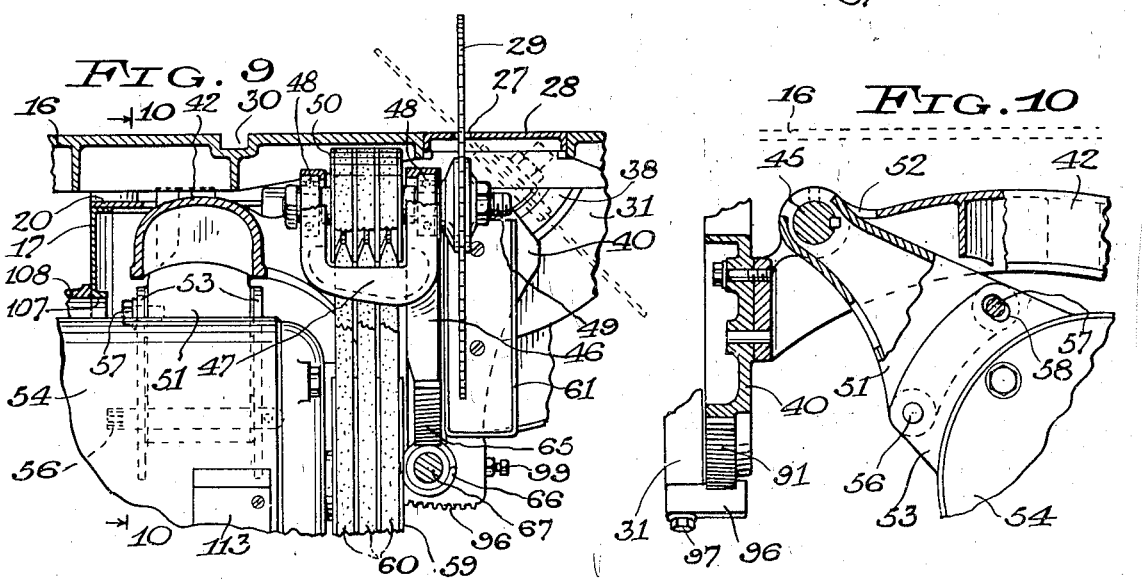
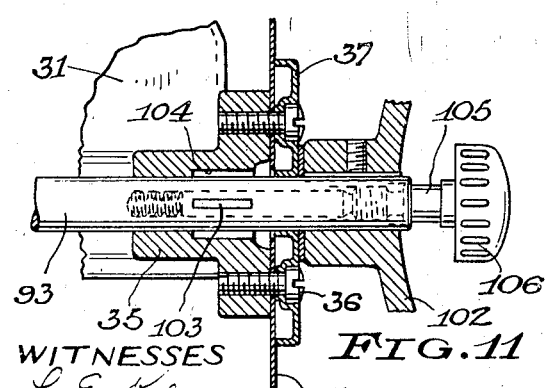
INVENTOR
HERBERT E. TAUTZ
BY
ATTORNEY
WITNESSES Patented Dec. 9, 1941

2,265,407

UNITED STATES PATENT OFFICE 2,265,407

TILTING ARBOR SAW

Herbert E. Tautz, Milwaukee, Wis., assignor to The Delta Manufacturing Company, Milwaukee, Wis., a corporation of Wisconsin Application January 25, 1939, Serial No. 252,744

2 Claims. (Cl. 143—36)

This invention relates to machine tools and more particularly to circular saws and the like.

An object of the invention is to provide a machine tool having an improved means of strong and rigid construction for adjustably supporting a rotary tool element, which will accurately maintain the tool element in its adjusted position, and which is capable of inexpensive manufacture.

Another object is to provide improved means for adjustably supporting a tool arbor and a driving motor therefor, and for readily effecting adjustment of the tension of a driving belt for the arbor.

A further object is to provide a circular saw machine or the like which will permit the use of an efficient short-center belt drive capable of supplying adequate power to the rotary cutter, which will not interfere with a substantial projection of the cutter above the table of the machine, and which will permit the motor and associated cutter mechanism to be housed in a relatively small enclosure.

The invention further consists in the several features hereinafter described and claimed.

In the accompanying drawings, wherein by way of example the invention is shown to be embodied in a circular saw of the tilting arbor type:

Fig. 1 is a front elevation of the circular saw, parts being broken away and parts being shown in section, and a tilted position of the saw blade being indicated in dotted lines;

Fig. 2 is a top view of the saw with the table and other parts thereof removed, and parts being broken away;

Fig. 3 is a detail sectional elevation taken generally along the line 3—3 of Fig. 2;

Fig. 4 is a detail sectional view taken generally along the line 4—4 of Fig. 3;

Fig. 5 is a detail view of a corner portion of the machine with the table removed, parts being broken away and parts being shown in section;

Fig. 6 is a sectional elevation taken generally along the line 6—6 of Fig. 1, a lowered position of the saw and its driving motor being indicated by dotted lines;

Fig. 7 is a sectional elevation taken generally along the line 7—7 of Fig. 2, the table being in place, and a tilted position of a trunnion of the machine being indicated by dotted lines;

Fig. 8 is a sectional elevation taken generally along the line 8—8 of Fig. 2;

Fig. 9 is a sectional elevation taken generally along the line 9—9 of Fig. 2, the table being in place, and a tilted position of the saw being indicated by dotted lines;

Fig. 10 is a sectional elevation taken generally along the line 10—10 of Fig. 9, the table being indicated in dotted lines, and Fig. 11 is a detail sectional elevation taken generally along the line 11—11 of Fig. 2.

In these drawings, 15 designates an upright tubular box-like casing on which is mounted a work-supporting table or platform 16. The casing is here shown to be of the type disclosed in my copending application for Machine cabinets, Serial No. 245,199, filed December 12, 1938, and comprises vertical side walls formed by marginally flanged sheet metal panels 17 of angular shape rigidly secured together, as by spot welding, the vertical joints between the casing panels extending centrally along the side walls. A sheet metal bottom plate 18 is rigidly secured to the lower edges of the panels, and feet 19 are rigidly secured to the corner portions of the bottom plate. A flat sheet metal top plate or gusset plate 20, preferably of heavier stock than the cabinet side walls, rests on and is rigidly spot welded to the inwardly flanged upper edges of the casing side walls, and is in the form of a rectangular loop. The top plate presents an accurate flat top surface for mounting various members hereinafter described, and is provided adjacent to its corner portions with bolt-receiving openings 21 and 22, Fig. 5. The front and rear edges of the top plate project outwardly from the cabinet walls.

The front wall of the cabinet is provided at its lower portion with an opening 23 for a removable door 24 to permit the removal of sawdust or other debris, the door having a suitable lock 25.

The work-supporting table or platform 16, which is suitably ribbed on its underside, rests on the corner portions of the top plate 20 and is detachably secured thereto by screws 26 passing through the openings 21. The machine illustrated is a tilting arbor circular saw, and the table is accordingly provided with the usual saw slot 27, preferably formed in a detachable insert plate 28, to receive therethrough a circular saw blade 29. The table also has the usual guideways 30 extending parallel to the saw blade, and is capable of a slight angular adjustment on the cabinet top plate 20 to secure such parallelism, this adjustment being effected before the screws 26 are fully tightened. The table and cabinet provide a mutual bracing effect so as to improve the rigidity of the machine.

A pair of apertured front and rear frame members or trunnion brackets 31 and 32, respectively, are placed in the cabinet near the front and rear walls thereof, each bracket having flat-bottomed ears 33 at opposite ends resting on the top plate 20 of the cabinet and rigidly secured thereto by bolts 34 passing through the top plate openings 22. One of the ears on the rear bracket, 32, is here shown to be widened, Fig. 2, and to be fastened by two bolts, so as to prevent any tendency toward tipping. At its lower portion, the front trunnion bracket, 31, has a bearing projection 35 which abuts against the inner face of one of the side walls of the cabinet and which is secured thereto by screws 36, these screws also passing through a clamping plate 37 at the outer face of this side wall, and the clamped portion of the trunnion bracket being located adjacent to a corner portion of the cabinet. Each trunnion bracket is formed by an approximately flat casting which is suitably ribbed at its outer side, the configuration of each bracket being such as to permit inexpensive production. The front bracket, 31, has a machined arcuate trunnion rib 38 at its inner side, and the rear bracket, 32, has a similar rib 39 of somewhat shorter radius. These ribs are concentric about an axis extending approximately in the plane of the table top and in the plane of the saw blade.

Between the trunnion brackets 31 and 32 is mounted a carriage or cradle which comprises front and rear trunnions 40 and 41, respectively, rigidly connected by an arched yoke 42, the trunnions having arcuate grooves 43 and 44, respectively, in which the trunnion bracket ribs 38 and 39 slidably fit to firmly support the carriage and to define a horizontal pivotal axis for the carriage extending approximately in the plane of the table top and in the plane of the saw blade. The trunnions are in the form of ribbed plate-like castings which can be inexpensively produced, and are screwed and doweled to the opposite ends of the yoke 42, the yoke ends presenting flat parallel faces which abut the inner faces of the trunnions. The arched yoke is also curved to space its intermediate portion away from the saw blade, as seen in Fig. 2. The yoke is of inverted channel cross-section, Fig. 9, and is internally ribbed to provide increased strength and rigidity.

A rock shaft 45 is journalled in spaced bearings formed in the front portion of the yoke and has its axis parallel to the axis of rotation of the saw blade. An arm or bracket 46 has a split hub portion keyed and clamped on a projecting end of the rock shaft 45. The arm has a forked or U-shaped free end 47, Fig. 9, forming laterally spaced portions which carry aligned ball bearings 48, preferably of the grease-sealed pre-loaded type. A saw arbor 49 is journalled in the ball bearings and detachably carries the saw blade 29, and a multiple-grooved pulley 50 is secured on the arbor between the bearings. The arm 46 is axially shiftable on the rock shaft 45 to center the saw blade with respect to the carriage axis and the table saw slot.

A motor arm or bracket 51 has a hub portion rigidly keyed and secured on an intermediate portion of the rock shaft 45 and fits in an opening 52 formed in the yoke 42 between the shaft bearings, thus confining this bracket and the rock shaft against axial displacement. The free end of the motor bracket fits between a pair of parallel flanges 53, Figs. 9 and 10, secured to the frame of an electric motor 54, the flanges being at right angles to the motor shaft 55, and the motor shaft being parallel to the rock shaft 45. The motor is pivoted on the bracket 51 by a pin 56, Fig. 10, passing through the motor flanges 53 and extending parallel to the rock shaft 45. A clamping screw 57, Figs. 9 and 10, passes through a slot 58 in one of the motor flanges and is threaded into the motor bracket 51. The motor shaft carries a multiple-grooved pulley 59 which is drivingly connected to the arbor pulley 50 by multiple V-belts 60, the tension on the belts being adjusted by swinging the motor on the pin 56 and locking the motor in angularly adjusted position by the screw 58.

The front trunnion, 40, carries a suitable saw-dust guard 61, and the rear trunnion carries a detachably mounted splitter 62, Fig. 6, which extends upwardly through the slotted insert plate 28. If desired, the rear trunnion may also carry an extension rod 63, Fig. 6, for supporting a splitter or guard, or both, (not shown), the rod being adapted to pass through apertured portions of the rear casing wall and rear trunnion bracket and to be clamped to the rear trunnion, 41, the latter having an opening 64 to receive a shouldered portion of the rod.

The saw arbor and motor are raised and lowered by a sector gear 65 on the lower portion of the arbor arm 46, Figs. 6 and 9, meshing with a worm 66 fast on a horizontal shaft 67 journalled in self-lubricating or oil-impregnated bushings 68 in the front and rear trunnions, the shaft extending parallel to the tilting axis of the carriage and being confined against axial displacement by shaft collars 69 engaging the rear trunnion. The teeth of the sector gear are skewed, but not curved, so as not to interfere with axial adjustment of the arbor arm 46 on which the gear is formed. The sector gear has stop projections 70 at its ends engageable with the ends of the worm 66 to limit the raising and lowering movement of the saw. These stop projections lie in the central plane of the worm and of the row of teeth on the sector gear, so as to avoid twisting strains on the mechanism when the stop projections engage the worm. The shaft 67 extends through an arcuate slot 71 in the front wall of the cabinet and carries a handwheel 72 which is detachably keyed thereon. The front trunnion 40 and front trunnion bracket 31 have openings 73 and 74, respectively, to provide clearance for the sector gear 65 when the saw is lowered, the shaft 67 passing through the opening 74.

A tubular member or pointer bracket 75 has a bore 76 through which the shaft 67 extends, the tubular member being rigidly secured by screws 77 to the front face of the front trunnion and passing through the openings 74 and 71 in the front trunnion bracket and front cabinet wall. At its rear end the tubular member 75 has a lug 78 entering a recess in the front trunnion 40 to prevent relative rotation of the tubular member and trunnion. At its front end the tubular member has an arm 79 to which a pointer 80 is adjustably secured by a screw 81, the pointer cooperating with an arcuate scale 82 secured to the front wall of the cabinet above the arcuate slot 71 to indicate the angularity of the saw. The front end of the shaft 67 has a central bore 83 communicating with a pair of diametrically opposite slots 84 extending radially through the shaft. A plunger 85 is slidable in the bore 83 and is normally urged outwardly by a coiled spring 86 in the inner end of the bore. The plunger 85 has diametrically opposite rearwardly converging inclined keyways 87 at its inner end registering with the slots 84. Flat wedge keys 88 fit in these slots and keyways and are confined against longitudinal movement by the end walls of the slots. The outer edges of the keys are engageable with the walls of the bore 76 in the tubular member 75, and the inner edges are engageable with the inclined bottoms of the keyways 87. A stem 89 is screw-threaded in the outer end of the shaft and carries a hand knob 90 at its outer end, the stem being engageable with the outer end of the wedging plunger 85. By screwing the stem 89 inwardly, the plunger 85 is forced inwardly and the keys 88 are forced radially outwardly by the bottom walls of the keyways 87 to urge the keys into tight frictional engagement with the walls of the bore 76 in the tubular member 75, thus locking the shaft 67, and consequently the saw arbor arm or bracket 46, in adjusted position. The keys 88 are released by the spring 86 when the stem 89 is screwed outwardly.

The motor 54 and its pulley 59 are spaced from the plane of the saw blade 29, thereby permitting the use of a short-center belt drive in which the distance between the saw arbor and motor shaft is somewhat less than the aggregate radii of the saw blade and motor frame. The arbor pulley is preferably smaller in diameter than the motor pulley so that the arbor speed will be greater than the motor speed, thus avoiding the need for a high-speed motor. The use of a multiple V-belt drive permits adequate power to be transmitted to the saw blade without requiring unduly large pulleys or excessive belt speed. The use of a small diameter pulley on the arbor shaft is an advantage, as the projection of the saw blade above the table will not be unduly limited. The arbor arm 46, with its sector gear 65, and also the worm shaft 67, occupy the space between the plane of the saw blade and the plane of the nearest pulley flanges, thus avoiding interference with the arbor drive and with the raising and lowering of the saw. The arched shape of the yoke of the tiltable carriage provides clearance for the motor in its uppermost position, and the lateral curvature of the yoke provides clearance for the saw arbor.

The saw arbor is tiltable between limit positions by means of a sector gear 91 formed on the front trunnion 40, Fig. 8, meshing with a worm 92 fast on a horizontal shaft 93 journalled in the lower portion of the front trunnion bracket 31, the shaft being confined against axial movement, as by the worm and a collar 94 engaging opposite ends of a bearing projection 95 of the bracket. The front trunnion 40 with its sector gear 91 is confined against lateral displacement by a hooked guide member 96, Figs. 8 and 10, slidably embracing the gear and secured by a screw 97 to the front trunnion bracket 31. At opposite ends of the sector gear, 91, the front trunnion, 40, carries adjustable stop screws 98 and 99 which are engageable with stop lugs 100 and 101, respectively, on the front trunnion bracket. These stop screws lie in the vertical plane of the worm shaft 93 and sector gear so as to avoid warping or twisting of the mechanism when the stop screws are brought into engagement with the lugs. The stop screw 98 is engageable with the lug 100 to determine a vertical position of the saw blade, and the stop screw 97 is engageable with the lug 101' to determine an angular position of the saw blade, preferably 45° from the vertical.

The shaft 93 extends through a side wall of the cabinet and has secured thereto a hand-wheel 102 similar to or identical with the hand-wheel 72. The shaft 93 also carries a locking device similar to the locking device for the shaft 67, and including radially movable wedge keys 103 engageable with the walls of a bore 104 formed in the bearing portion 35 of the front trunnion bracket, these keys being urged radially outwardly to locking position by a screw-threaded stem 105 carrying an operating knob 106.

The motor 54, in some of its positions, extends through a clearance opening 107 in the adjacent side wall of the cabinet, the opening being normally closed by a dome-shaped cover 108.

The front wall of the cabinet carries a switch box 109, preferably of the double-pole type, which extends through an opening 110 in this wall, Fig. 9, and is secured to the wall by screws 111, one being indicated in Fig. 8. The switch box is connected by a flexible conductor cord 112 to a terminal box 113 on the motor. A flexible conductor cord 114 external to the cabinet is also connected to the switch box and is adapted to be plugged into a receptacle.

As the cabinet is almost entirely enclosed, most of the sawdust produced during the use of the machine will be caught in the cabinet. If desired, a blower or suction device, not shown, may be applied to the cabinet to carry off most of the sawdust.

In assembling the machine, the front trunnion bracket 31 is secured to the cabinet and is followed by the carriage or cradle and the rear trunnion bracket 32 which latter is urged forwardly to take up axial play before tightening its clamping screws. After the trunnions and carriage are mounted, the pointer bracket 75, hand-wheels and locking knobs are attached, and the motor and wiring are installed. The V-belts 60 are mounted on the arbor pulley by passing them over the forked portion 47 of the saw arbor arm or bracket, the forked portion extending below the arbor pulley and between the runs of the belt so as not to interfere with belt changing. The motor is shiftably mounted with respect to the saw arbor so as to facilitate adjustment of belt tension and replacement of the belts. The conductor cord 114 and switch box 109 are inserted through the front cabinet wall opening 110 from the rear, thus permitting the motor and its cords and switch box to be supplied as a unitary assembly and avoiding difficulty in making cord connections. The motor cover 108 and table 16 are secured in place, the saw blade being mounted on the arbor 49 to facilitate table alignment.

In the operation of the machine, the saw arbor is belt-driven by the electric motor 54, and work is passed over the table to be cut by the rotating saw blade. To adjust the projection of the saw blade above the table, the saw may be raised or lowered by turning the hand-wheel 72, the adjustment being maintained by operating the locking knob 90. The upward and downward travel of the saw is limited by the stop projections 70 on the sector gear 65 striking the ends of the worm 66. When the saw blade is lowered, the adjusting shaft 67 is accommodated in the space between the plane of the saw blade and the nearest driving belt. The saw blade may be tilted by turning the hand-wheel 102 and is held in adjusted position by the locking device 106, the angular position of the blade being indicated by the pointer 80 cooperating with the scale 82. The tilting travel of the saw is limited by the stop screws 98 and 99 on the front trunnion 40 striking the cooperating stop lugs on the front trunnion bracket 31. The 45° limit position of the saw blade is shown by dotted lines in Figs. 1 and 9. The tilting mechanism is carried by the front trunnion bracket, thus insuring accurate assembly and adjustment. The front and rear trunnion mountings have their arcuate ribs of substantially different radii, thus considerably reducing any tendency toward warping or weaving.

While the invention is here shown to be embodied in a circular saw, the invention is also applicable to other machine tools, such as shapers. Various tool elements may be mounted on the arbor, such as molding cutters and abrasive disks.

What I claim as new and desire to secure by Letters Patent is:

1. In a machine tool, a cabinet structure, a yoke; said yoke being generally U-shaped in plan; means associated with the legs of said yoke journalling the same for rocking movement about a substantially horizontal axis with respect to said cabinet structure; one leg of said yoke having a pair of spaced journal portions provided thereon, the neighboring sides of which form bearing cheeks; a rock shaft journalled in said journal portions about an axis transverse to said horizontal axis; a motor support rigidly secured to said rock shaft between said journal portions and projecting toward the other leg of said yoke, said motor support closely fitting between said bearing cheeks so as to restrain said rock shaft against axial displacement; a motor carried by said motor support; an arbor support secured to said rock shaft; a tool arbor journalled in said arbor support for rotation about an axis substantially parallel to said rock shaft; and belt drive means between said motor and said arbor; said arbor support being axially adjustable along said shaft, but non-rotatable with respect thereto, for enabling a tool carried thereby to be accurately located with respect to said cabinet structure.

2. In a machine tool, a cabinet; a pair of downwardly extending supports carried by said cabinet; a yoke; said yoke being generally U-shaped in plan and being made up of a central member and a pair of end plates rigidly secured together in unitary relationship; means journalling said end plates for rocking movement about a substantially horizontal axis on said supports, said end plates extending downwardly a substantial distance and each having bearing means at its lower end, a shaft extending from one end plate to the other and journalled in said bearing means; a worm on said shaft; a rock shaft journalled in one end of said yoke about an axis transverse to said horizontal axis; means for supporting a tool arbor and a motor upon said rock shaft; belt drive means between said motor and said arbor; sector gear means rigidly secured to said rock shaft and meshing with said worm, one of said end plates being provided with a sector gear outwardly of its bearing means; a worm shaft journalled in one of said supports adjacent said sector gear, and having a worm meshing with said sector gear, and means for rotating said worm shaft, for rocking said yoke about its axis.

HERBERT E. TAUTZ.